(12) United States Patent
Shin et al.

(10) Patent No.: US 8,614,531 B2
(45) Date of Patent: Dec. 24, 2013

(54) STATOR CORE AND MOTOR DEVICE INCLUDING THE SAME

(75) Inventors: Kyung Seob Shin, Gyunggi-do (KR); Sang Kyu Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 260 days.

(21) Appl. No.: 13/033,001

(22) Filed: Feb. 23, 2011

(65) Prior Publication Data

US 2012/0019094 A1  Jan. 26, 2012

(30) Foreign Application Priority Data

Jul. 21, 2010 (KR) .................. 10-2010-0070514

(51) Int. Cl.
*H02K 1/06* (2006.01)
(52) U.S. Cl.
USPC .................................................. 310/216.074
(58) Field of Classification Search
USPC ............... 310/216.072–216.074, 67 R
See application file for complete search history.

(56) References Cited

U.S. PATENT DOCUMENTS

| | | | |
|---|---|---|---|
| 4,745,312 A * | 5/1988 | Nagasaka ................. | 310/49.55 |
| 5,030,864 A * | 7/1991 | Van Hout et al. .......... | 310/67 R |
| 6,218,760 B1 * | 4/2001 | Sakuragi et al. ......... | 310/216.111 |
| 6,856,065 B2 * | 2/2005 | Suzuki et al. ........... | 310/216.074 |
| 7,271,519 B2 | 9/2007 | Lee | |
| 7,692,354 B2 * | 4/2010 | Abou-Akar et al. ... | 310/216.111 |
| 7,737,600 B2 * | 6/2010 | Endo et al. ............. | 310/216.111 |
| 2007/0126309 A1 * | 6/2007 | Jun et al. ................ | 310/216 |
| 2010/0253176 A1 * | 10/2010 | Ovrebo et al. .......... | 310/216.073 |

FOREIGN PATENT DOCUMENTS

| | | |
|---|---|---|
| JP | 06-292332 | 10/1994 |
| JP | 2005-168223 | 6/2005 |
| JP | 2010-035354 | 2/2010 |
| KR | 10-0548447 B1 | 4/2005 |

OTHER PUBLICATIONS

Korean Office Action, w/ English language version thereof, issued in Korean Patent Application No. 10-2010-0070514, dated Aug. 10, 2011.
Chinese Office Action for Application No. 201110049476.0 dated Jun. 5, 2013.

* cited by examiner

*Primary Examiner* — Thanh Lam
(74) *Attorney, Agent, or Firm* — McDermott Will & Emery LLP (57) ABSTRACT

Disclosed is a stator core including a core back fixedly inserted onto an outer surface of a stationary member, a plurality of teeth protruding from the core back in an outer diameter direction, wherein a coil is wound around the plurality of teeth so as to allow magnetic flux from a magnet to flow to the teeth, front end portions defining outer edges of the teeth, respectively, and body portions defining a length of the teeth and having a width increasing from the core back toward the front end portions, respectively.

8 Claims, 6 Drawing Sheets

STATOR CORE AND MOTOR DEVICE INCLUDING THE SAME

CROSS-REFERENCE TO RELATED APPLICATIONS

This application claims the priority of Korean Patent Application No. 10-2010-0070514 filed on Jul. 21, 2010, in the Korean Intellectual Property Office, the disclosure of which is incorporated herein by reference.

BACKGROUND OF THE INVENTION

1. Field of the Invention

The present invention relates to a stator core and a motor device including the same, and more particularly, a stator core having an improved stator core shape to maximize current characteristics and motor efficiency, and a motor device including the same.

2. Description of the Related Art

Electric motors are devices that convert electrical energy into mechanical energy, and may be classified into various kinds according to types of power being supplied thereto, driving methods, rotor types and exterior structures associated with frames, brackets and the like. Furthermore, the electric motors, classified as above, may be re-classified according to insulating methods, bearing types, outputs, number of rotations, voltage, frequency and the like.

Among those motors, a spindle motor installed inside an Optical Disk Drive (ODD) rotates a disc so that an optical pickup unit moving in a linear direction can read data recorded on the disc.

Disk drives are applicable to portable multimedia devices such as laptop computers that are handy to carry and use anywhere and anytime. There has been a demand for thinner disk drives to cope with a current trend toward smaller portable media devices.

Most spindle motors, currently being installed in disk drives, have a stator core produced by the following processes: stacking a plurality of core sheets, pressed silicon steel plates, forming an insulating layer on the resultant stack and winding a coil therearound. In this case, an electromagnetic force, generated by current flowing in the wound coil, acts as the cause of rotational torque of spindle motors.

However, as a motor is driven according to the related art, eddy current is increasingly generated, causing defective motor operation, and Back Electro Motive Force (Back-EMF) waveforms are rendered sharp, degrading the efficiency of the motor.

Moreover, the stator core provided as a stack of cores interrupts magnetic flux from a magnet to the cores, due to the stacked structure thereof. This may accelerate magnetic saturation in the ends of the cores, thereby degrading motor efficiency.

Therefore, an optimized design for a stator core is being currently demanded in order to minimize the loss of a motor while ensuring motor characteristics.

SUMMARY OF THE INVENTION

An aspect of the present invention provides a stator core, capable of minimizing the loss of a motor by rendering magnetic flux, flowing from a magnet to a core, smooth and capable of enhancing the characteristics of a motor by reducing eddy current loss, and a motor device including the same.

According to an aspect of the present invention, there is provided a stator core including: a core back fixedly inserted onto an outer surface of a stationary member; a plurality of teeth protruding from the core back in an outer diameter direction, wherein a coil is wound around the plurality of teeth so as to allow magnetic flux from a magnet to flow to the teeth; front end portions defining outer edges of the teeth, respectively; and body portions defining a length of the teeth and having a width increasing from the core back toward the front end portions, respectively.

The body portions may respectively include indented portions, each being depressed in one surface of a corresponding one of the body portions while protruding to the other surface thereof.

The indented portions may have circumferential surfaces with the same diameter.

Each of the indented portions may be formed in an outer portion of a corresponding one of the body portions.

The teeth may be formed to satisfy a conditional expression below:

$$0.57 \le \frac{(Wmax - \Phi D)}{Wmin} < 1.4$$

where Wmin denotes a width of each of the body portions to which the core back is connected, $\Phi D$ denotes a diameter of a circumferential surfaces of each of the indented portions, and Wmax denotes a width of each of the body portions in which the centers of the indented portions are placed, respectively.

The teeth may be formed to satisfy a conditional expression below:

$$0.85 \le \frac{B}{A} \le 0.95$$

where B denotes a radius of a circumference drawn along respective centers of the indented portions while being centered on the center of the core back, and A denotes a radius of a circumference drawn along respective outer surfaces of the front end portions while being centered on the center of the core back.

According to another aspect of the present invention, there is provided a motor device including: a stationary member having an insertion hole therein; a rotating member inserted in the insertion hole to be rotatable relative to the stationary member; and a stator core including a core back fixedly inserted onto an outer surface of a stationary member, a plurality of teeth protruding from the core back in an outer diameter direction, wherein a coil is wound around the plurality of teeth so as to allow magnetic flux from a magnet to flow to the teeth, front end portions defining outer edges of the teeth, respectively, and body portions defining a length of the teeth and having a width increasing from the core back toward the front end portions, respectively.

The body portions may respectively include indented portions having circumferential surfaces with the same diameter, the indented portions each being depressed in one surface of a corresponding one of the body portions while protruding to the other surface thereof.

The teeth may be formed to satisfy a conditional expression below:

$$0.57 \leq \frac{(Wmax - \Phi D)}{Wmin} < 1.4$$

where Wmin denotes a width of each of the body portions to which the core back is connected, ΦD denotes a diameter of a circumferential surfaces of each of the indented portions, and Wmax denotes a width of each of the body portions in which the centers of the indented portions are placed, respectively.

The teeth may be formed to satisfy a conditional expression below:

$$0.85 \leq \frac{B}{A} \leq 0.95$$

where B denotes a radius of a circumference drawn along respective centers of the indented portions while being centered on the center of the core back, and A denotes a radius of a circumference drawn along respective outer surfaces of the front end portions while being centered on the center of the core back.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the same reference numerals will be used throughout to designate the same or like components having the same function.

Figure 1:
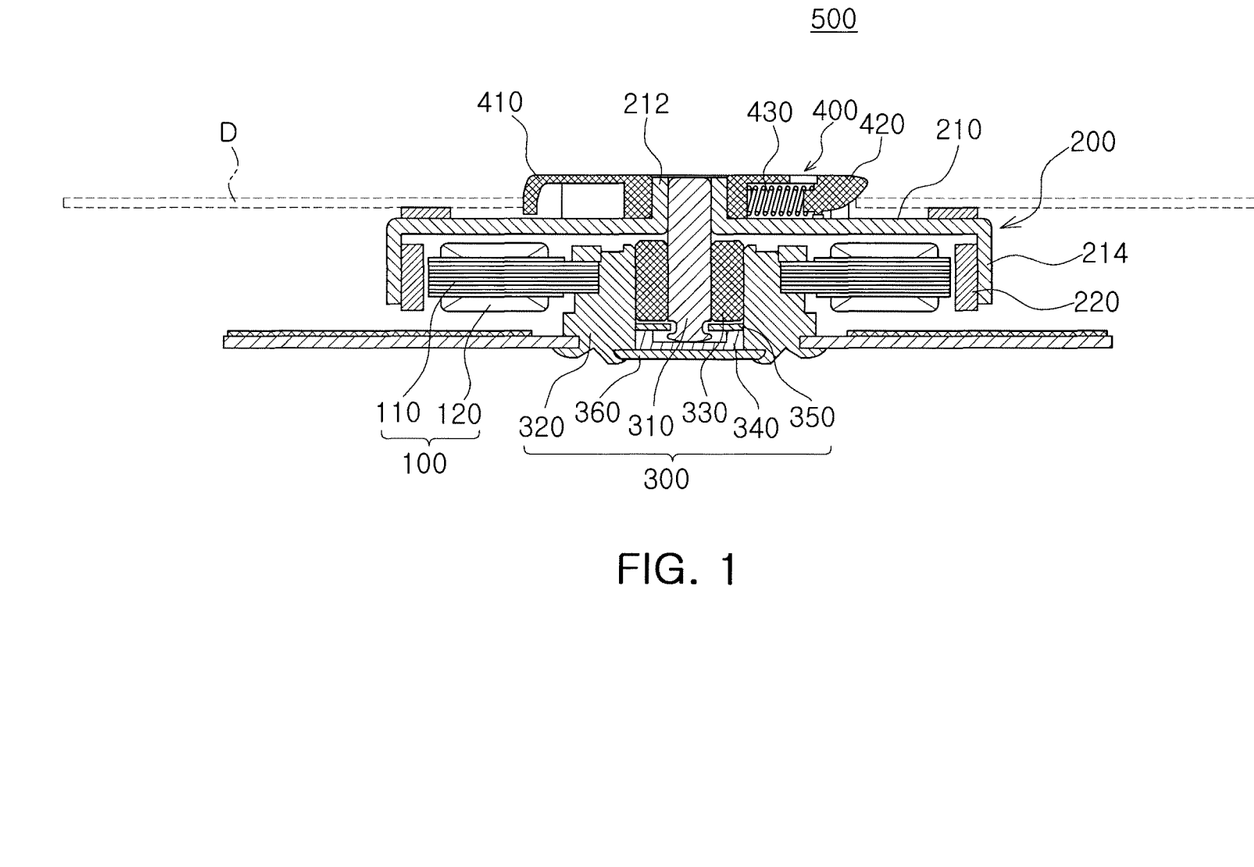
FIG. 1 is a schematic cross-sectional view illustrating a motor device including a stator core according to an exemplary embodiment of the present invention.

FIG. 1 is a schematic cross-sectional view illustrating a motor device including a stator core according to an exemplary embodiment of the present invention.

Referring to FIG. 1, a motor device 500 including a stator core 110, according to an exemplary embodiment of the present invention, may include a stator 100 including a stator core 110, a rotor 200, a bearing assembly 300, and a disk chucking device 400.

Concrete embodiments of the stator core 110 will be described later. The motor device 500 according to the present invention may possess all of the features associated with each of the embodiments of the stator core 110.

The stator 100 may refer to a stationary member with an insertion hole therein, that is, every stationary part other than rotating parts. However, for the ease of description, the stator 100 is described and illustrated as including the stator core 110 and a winding coil 120.

The stator 100 is a stationary part that includes the winding coil 120 and the stator core 110. The winding coil 120 generates an electromagnetic force having a predetermined magnitude when power is applied thereto. The stator core 110 is formed by stacking a plurality of core sheets 110a about which the winding coil 120 is wound.

The winding coil 120 is electrically connected with a flexible printed circuit board such that external power is supplied thereto.

In this case, the stator 100 is fixed by a base 320 to be described later, and the winding coil 120 of the stator 100 is placed so as to face a magnet 220 attached to the inner surface of a rotor case 210.

The rotor 200 refers to a rotatable member rotating relative to the stationary member, and is inserted into the insertion hole of the stationary member so as to be rotatable therein.

The rotor 200 includes the rotor case 210 shaped like a cup. The rotor case 210 has the magnet 220 having a ring shape along the inner circumferential surface thereof. Here, the magnet 220 is a permanent magnet having magnetic north and south poles alternately magnetized in a circumferential direction to thereby generate a magnetic force having a predetermined magnitude.

The rotor case 210 includes a rotor hub 212 and a magnet support portion 214. The rotor hub 212 is fixedly inserted onto the shaft 310, and the magnet support portion 214 has the ring-shaped magnet 220 disposed along the inner surface thereof.

The rotor 200 is rotated by an electromagnetic interaction between the ring-shaped magnet 220 and the winding coil 120 wound about the stator core 110. Namely, as the rotor case 210 of the rotor 200 is rotated, the shaft 310 interworking with the rotor case 210 is rotated.

The bearing assembly 300 may include a base 320, the shaft 310, a sleeve 330, and a thrust plate 340.

The base 320 may be assembled by fixedly inserting the sleeve 330 into a receiving hole of the base 320.

The sleeve 330 may have a shaft hole to bind the shaft 310 therein. A plurality of radial dynamic pressure grooves may be formed in the inner surface of the shaft hole.

The shaft 310 is rotatably inserted into the shaft hole of the sleeve 330, and may be elongated in the direction of the axis of rotation.

Here, the thrust plate 340 is formed on the lower surface of the shaft 310 to thereby reduce a frictional force relative to the shaft 140 during rotation.

Furthermore, one end portion of the shaft 310 coming into contact with the thrust plate 340 may be formed to have a predetermined radius of curvature.

A ring-shaped stopper 350 is provided on the upper portion of the thrust plate 340. Corresponding with the ring-shaped stopper 350, a portion of the outer circumferential surface of the shaft 310 may be depressed toward the axis of the shaft 310 to thereby form a ring-shaped catching recess.

The inner circumferential surface of the stopper 350 is inserted into the catching recess to thereby prevent the shaft 310 from escaping upwardly out of the sleeve 330.

The thrust plate 340 overlies a support plate 360. The support plate 360 is engaged with the base 320 and serves to support the shaft 310.

The disk chucking device 400 may include a centering case 410, a chucking member 420 and an elastic member 430. The inner circumferential surface of a disc D may be secured to the center case 410.

When the disc D is press-fitted thereto, the elastic member 430 is compressed by the chucking member 420, so that the compression elastic force and restoring force of the elastic member 430 securely fixes the disc D to the center case 410.

Figure 2:
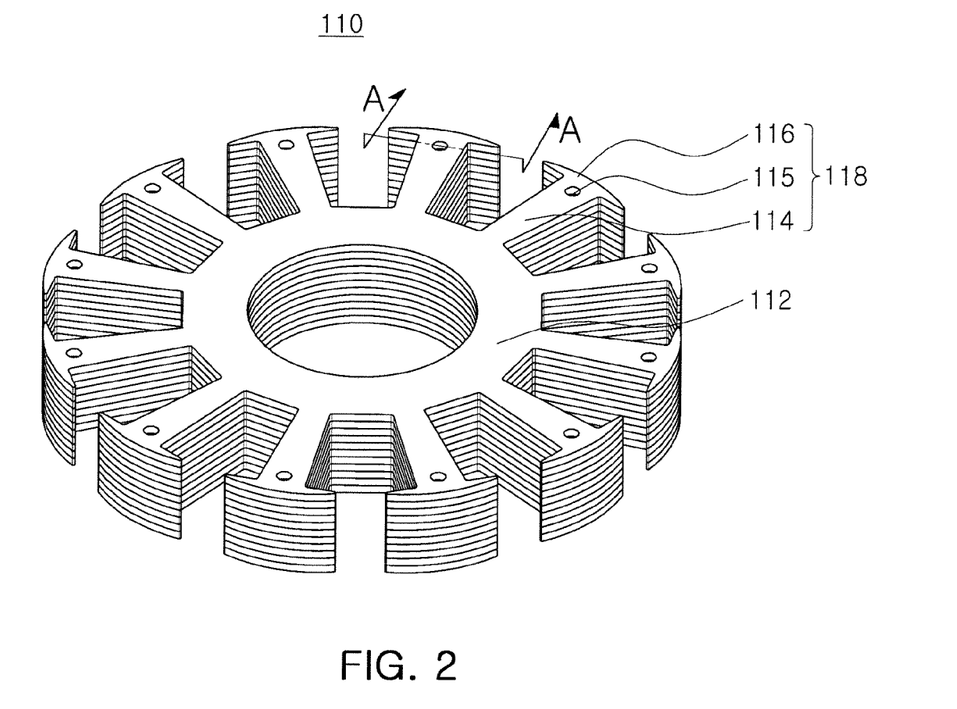
FIG. 2 is a schematic perspective view illustrating a stator core according to an exemplary embodiment of the present invention.
Figure 3:
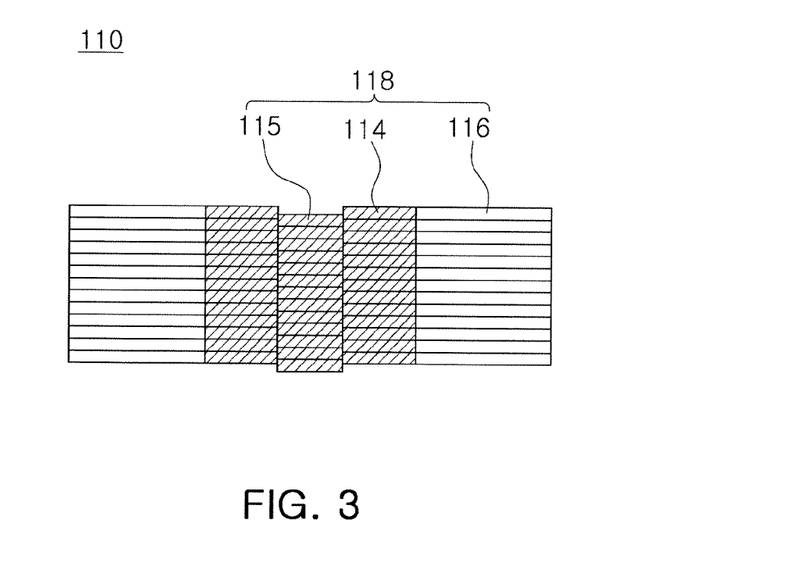
FIG. 3 is a schematic cross-sectional view taken along line A-A of FIG. 2, illustrating a stator core according to an exemplary embodiment of the present invention.
Figure 4:
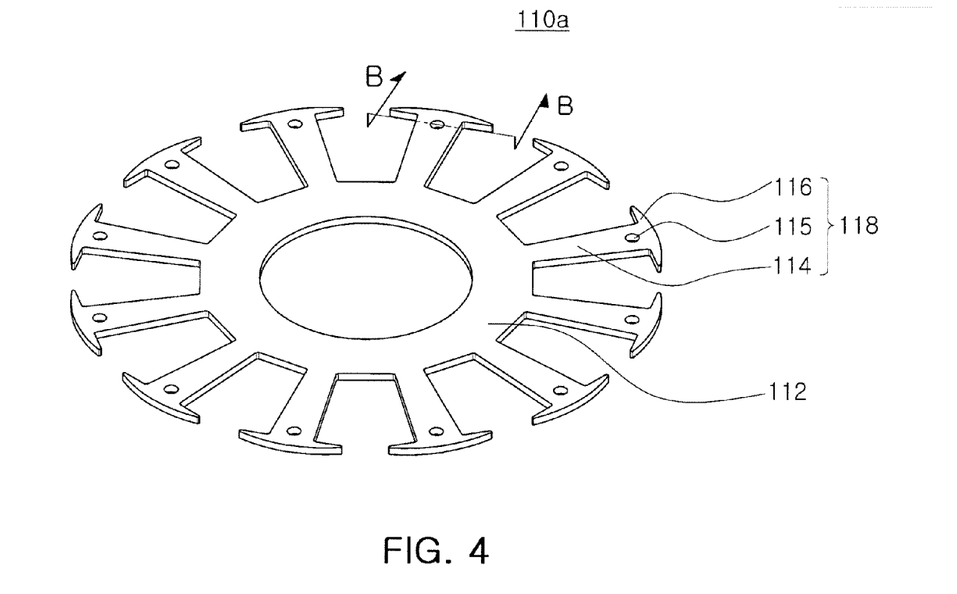
FIG. 4 is a schematic perspective view illustrating a single core sheet of a stator core according to an exemplary embodiment of the present invention.
Figure 5:
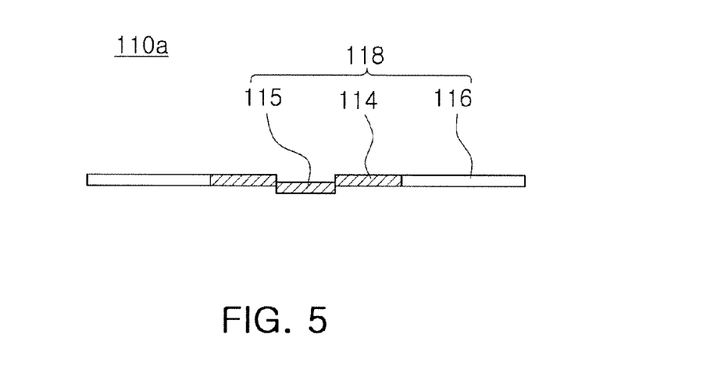
FIG. 5 is a schematic cross-sectional view taken along line B-B of FIG. 4, illustrating a single core sheet of a stator core according to an exemplary embodiment of the present invention.

FIG. 2 is a schematic perspective view illustrating the stator core according to an exemplary embodiment of the present invention. FIG. 3 is a schematic cross-sectional view taken along line A-A of FIG. 2, illustrating the stator core according to an exemplary embodiment of the present invention. FIG. 4 is a schematic perspective view illustrating a single core sheet of the stator core according to an exemplary embodiment of the present invention. FIG. 5 is a schematic cross-sectional view taken along line B-B of FIG. 4, illustrating the single core sheet of the stator core according to an exemplary embodiment of the present invention.

Referring to FIGS. 2 through 5, the stator core 110 according to an exemplary embodiment of the present invention may be formed by stacking core sheets 110a.

The core sheets 110a are prepared by pressing silicon steel plates. The stator core 110 may be formed as the plurality of core sheets 110a are stacked on top of one another.

Furthermore, the core sheet 110a may have respective indented portions 115 that are necessarily provided due to the addition of the stacking process. The indented portions 115 are coupled with one another to thereby ensure the stable stacking of the core sheets 110a for the stator core 110.

Here, the stator core 110 may include a core back 112 and teeth 118.

The core back 112 may have an opening to be fixedly inserted onto the stationary member. That is, the core back 112 may be fixedly inserted onto the base 320 of the stationary member. The opening may be placed in, for example, the center of the core back 112.

Furthermore, the core back 112 may have an annular shape. However, the shape of the core back 112 and the location of the opening are not limited to the drawing or description, and may be modified in various manners.

That is, the core back 112 may be modified to have various shapes, such as a quadrangular frame shape, a hexagonal frame shape, an octagonal frame shape and the like, so as to conform with the shape of the outer circumferential portion of the base 320.

Terms regarding directions are defined as follows: an outer diameter direction refers to a direction towards the outer circumferential surface of the ring-shaped core back 112 on the basis of the inner circumferential surface thereof, an inner diameter direction refers to a direction toward the inner circumferential surface of the core back 112 on the basis of the outer diameter direction thereof. That is, the outer diameter direction refers to a direction toward the outer edges of the teeth 118 from the base 320, the stationary member, while the inner diameter direction refers to a direction toward the base 320 from the outer edges of the teeth 118.

The teeth 118 protrude from the core back 112 in the outer diameter direction. The winding coil 120 is wound around the teeth 118, so that magnetic flux from the magnet 200 can flow thereto.

The teeth 118 may each include a front end portion 116 defining the outer edge of a corresponding one of the teeth 118 in the outer diameter direction, and a body portion 114 defining the length of the corresponding one.

Here, the respective front end portions 116 of the teeth 118 may have outer surfaces rounded such that the stator core 110 has an overall circular shape.

Each of the body portions 114 may have a gradually increasing width from the core back 112 toward the front end portion 112 thereof. This contributes to reducing eddy current loss while improving current properties to thereby optimize the performance of the motor device 500 including the stator core 110.

Furthermore, each of the body portions 114 may have the indented portion 115 functioning when the core sheets 110a are stacked in order to form the stator core 110. The indented portion 115 may be depressed in one surface of the body portion 114 while protruding to the other surface thereof.

The indented portions 115, necessarily provided due to the addition of the process of stacking the core sheets 110a, may have circumferential surfaces with the same diameter and be formed in the outer portions of the body portions 114, respectively.

The structure of the indented portion 115 and the disposition thereof on the body portion 114 will now be described with reference to FIGS. 6 through 8.

Figure 6:
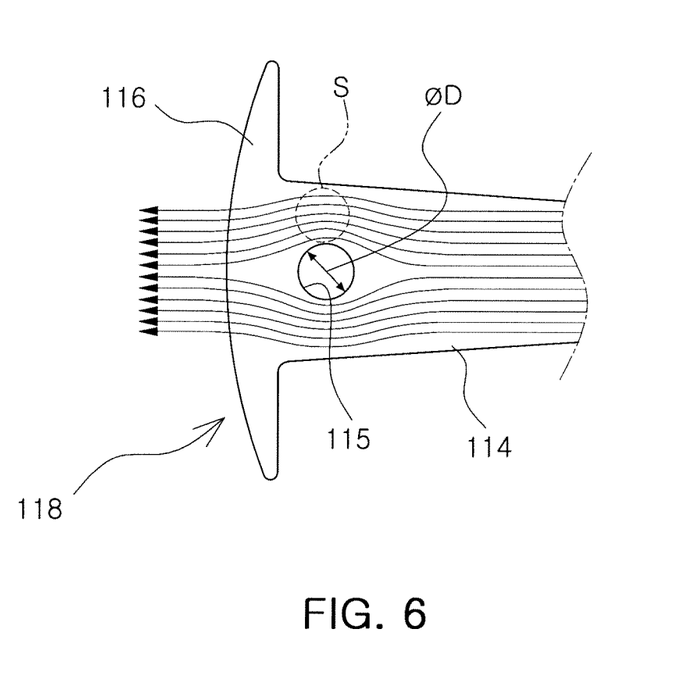
FIG. 6 is a schematic plan view illustrating lines of magnetic force around an indented portion of a stator core according to an exemplary embodiment of the present invention.

FIG. 6 is a schematic plan view illustrating lines of magnetic force around the indented portion of the stator core according to an exemplary embodiment of the present invention. FIG. 7 is a schematic plan view illustrating the stator core according to an exemplary embodiment of the present invention. FIG. 8 is a graph illustrating the waveforms of Back-EMF of the motor device including the stator core according to an exemplary embodiment of the present invention.

Figure 7:
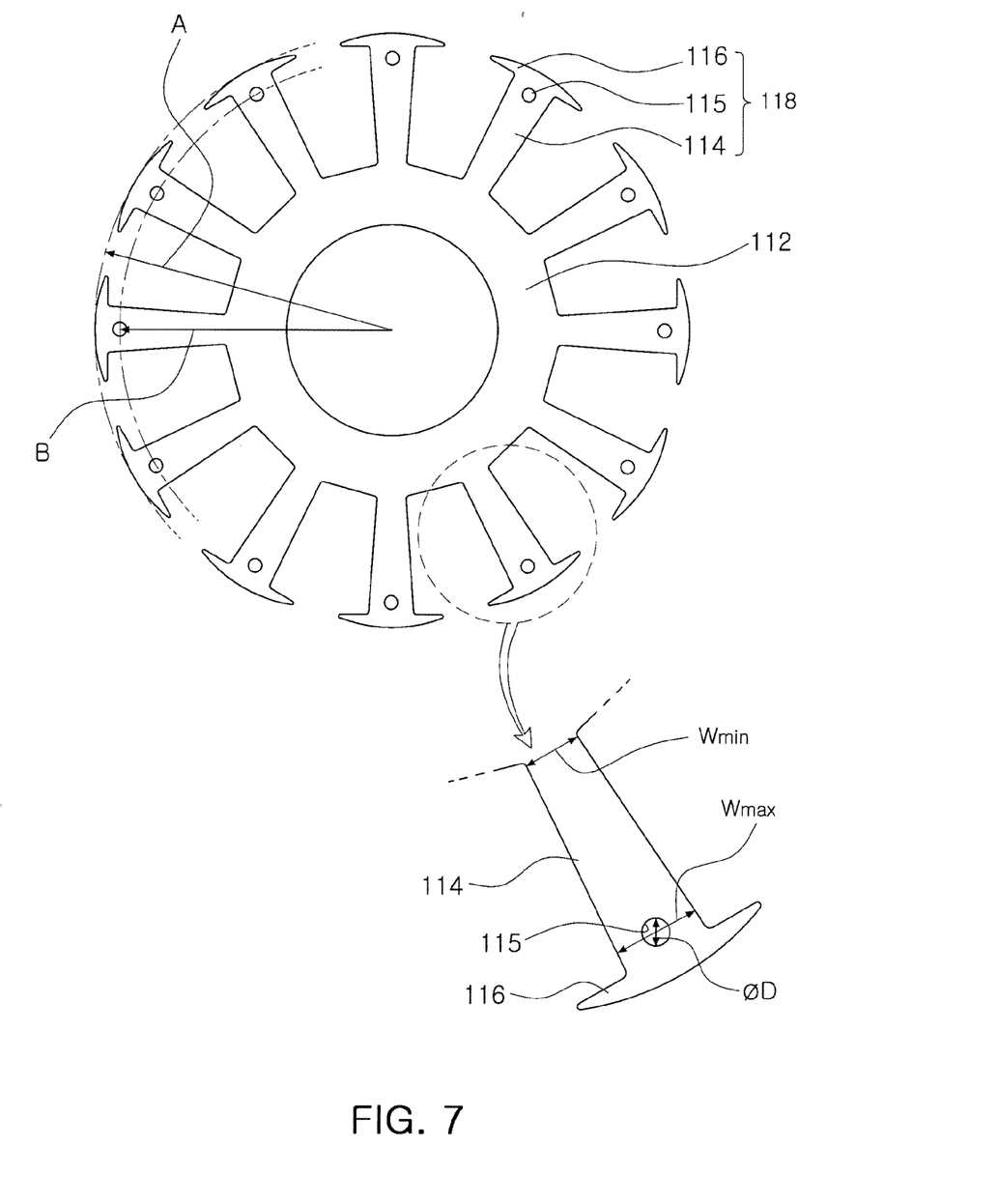
FIG. 7 is a schematic plan view illustrating a stator core according to an exemplary embodiment of the present invention.

Referring to FIGS. 6 and 7, the teeth 118 of the stator core 110, according to this exemplary embodiment, protrude from the core back 112 in the outer diameter direction. Also, the winding coil 120 is wound around the teeth 118 to thereby allow magnetic flux from the magnet 220 to flow thereto.

As for the stator core 110, the core sheets 110a are made to be thin enough to render the magnetic flux smooth, and these thinned core sheets 110a are stacked to thereby form the stator core 110. This contributes to minimizing eddy current loss and thus optimizing current and motor efficiency.

In this case, the indented portion 115 is formed in each of the body portions 114 in order to prevent the undesired separation between the core sheets 110a being stacked. However, these indented portions 115 may interrupt the magnetic flux flowing from the magnet 220 into the stator core 110.

That is, as shown in FIG. 6, the magnetic flux around the indented portion 115 of the body portion 114 is interrupted by the diameter 'ΦD' of the indented portion 115, undesirably accelerating magnetic saturation 'S' at the end portion of the stator core 110 and thus degrading the performance and efficiency of a motor.

For the purpose of drastically reducing the magnetic saturation caused by the indented portion 115, as shown in FIG. 6, the width Wmin of the body portion 114 to which the core back 112 is connected, the diameter ΦD of the circumferential surface of the indented portion 115, and the width Wmax of the body portion 114 in which the center of the indented portion 115 is placed, satisfy the following conditional expression 1:

$$0.57 \leq \frac{(Wmax - \Phi D)}{Wmin} < 1.4 \quad \text{(Conditional expression 1)}$$

The following table 1 shows the result of experiments upon Back-EMF by the indented portion 115, the flatness of the stator core 110, and noise.

TABLE 1

| (Wmax−ΦD)/Wmin | Magnetizing voltage (V) @1200 μF | Coil Winding outer diameter | Number of Turns | BACK-EMF Vrms @1500 rpm | BACK-EMF Vpp @1500 rpm | Core flatness 70 um↓ | Noise [dB] @1.4 KHz |
|---|---|---|---|---|---|---|---|
| 0.57 | 600 | 0.23 mm | 32 | 620 | 1.71 | 52 | 43 |
| 0.60 | 600 | 0.23 mm | 32 | 642 | 1.78 | 48 | 39 |
| 0.80 | 600 | 0.23 mm | 32 | 649 | 1.81 | 48 | 36 |
| 1.00 | 600 | 0.23 mm | 32 | 657 | 1.83 | 42 | 42 |
| 1.20 | 600 | 0.23 mm | 32 | 660 | 1.83 | 46 | 44 |
| 1.40 | 600 | 0.23 mm | 32 | 659 | 1.83 | 86 | 56 |
| 1.60 | 600 | 0.23 mm | 32 | 661 | 1.80 | 102 | 67 |

As it is seen from Table 1 above, a reduction in the level of noise, as well as core flatness, is achieved when 0.57≤ (Wmax−ΦD)/Wmin<1.4.

Meanwhile, the stator core 110 may be implemented to satisfy the following conditional expression 2, together with or independently of the above conditional expression 1.

$$0.85 \leq \frac{B}{A} \leq 0.95 \quad \text{(Conditional Expression 2)}$$

where B denotes the radius of a circumference drawn along the respective centers of the indented portions 115 while being centered on the center of the core back 112, and A denotes the radius of a circumference drawn along the respective outer surfaces of the front end portions 116 while being centered on the center of the core back 112.

When B/A is greater than 0.95, the indented portion 115 is placed excessively adjacent to the front end portion 116. This may help in preventing the separation of the core sheets 110a being stacked; however, this makes it difficult to control the flatness after the stacking and brings about limitations in using a manufacturing mold. Therefore, the stator core 110 may be formed within the range of conditional expression 2 above.

Figure 8:
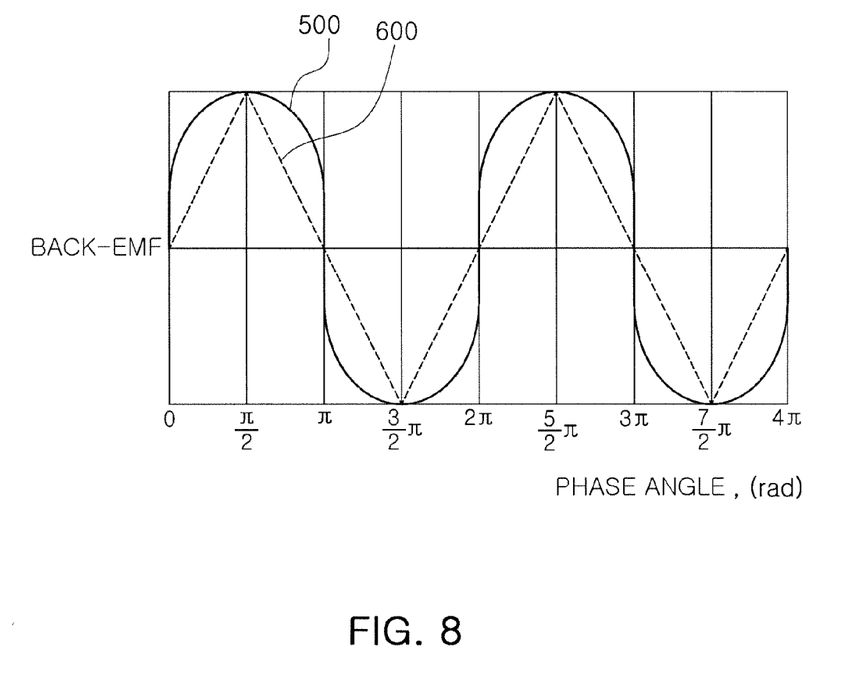
FIG. 8 is a graph illustrating the waveforms of Back-EMF of a motor device including a stator core according to an exemplary embodiment of the present invention.

Furthermore, referring to FIG. 8, it can be seen that the waveform of the Back-EMF of the motor device 500 including the stator core 110 according to this exemplary embodiment is a sine wave having a bell shape.

Accordingly, the stator core 110, according the exemplary embodiments of the present invention, is provided with the body portions 114 having a gradually increasing width and the indented portions 115 satisfying the above conditional expressions 1 and 2, thereby achieving a reduction in eddy current loss and thus enhancing the characteristics of the motor device 500.

Furthermore, since the magnetic flux from the magnet 220 to the core is rendered smooth, the performance of a motor is not deteriorated.

As set forth above, in the stator core and the motor device including the same according to exemplary embodiments of the invention, magnetic flux flowing to the core from the magnet is rendered smooth, thereby preventing the deterioration of a motor's performance.

Furthermore, motor characteristics can be enhanced by reducing eddy current loss and thus causing the Back-EMF waveform to have a sine curve.

While the present invention has been shown and described in connection with the exemplary embodiments, it will be apparent to those skilled in the art that modifications and variations can be made without departing from the spirit and scope of the invention as defined by the appended claims.

What is claimed is:

1. A stator core comprising:

a core back fixedly inserted onto an outer surface of a stationary member;

a plurality of teeth protruding from the core back in an outer diameter direction, wherein a coil is wound around the plurality of teeth so as to allow magnetic flux from a magnet to flow to the teeth;

front end portions defining outer edges of the teeth, respectively; and body portions defining a length of the teeth and having a width increasing from the core back toward the front end portions, respectively, wherein the body portions respectively include indented portions, each being depressed in one surface of an outer portion of a corresponding one of the body portions while protruding to the other surface thereof.

2. The stator core of claim 1, wherein the indented portions have circumferential surfaces with the same diameter.

3. The stator core of claim 1, wherein the teeth are formed to satisfy a conditional expression below:

$$0.57 \leq \frac{(Wmax - \Phi D)}{Wmin} < 1.4$$

where Wmin denotes a width of each of the body portions to which the core back is connected, ΦD denotes a diameter of a circumferential surfaces of each of the indented portions, and Wmax denotes a width of each of the body portions in which the centers of the indented portions are placed, respectively.

4. The stator core of claim 1, wherein the teeth are formed to satisfy a conditional expression below:

$$0.85 \leq \frac{B}{A} \leq 0.95$$

where B denotes a radius of a circumference drawn along respective centers of the indented portions while being centered on the center of the core back, and A denotes a radius of a circumference drawn along respective outer surfaces of the front end portions while being centered on the center of the core back.

5. A motor device comprising:
a stationary member having an insertion hole therein;
a rotating member inserted in the insertion hole to be rotatable relative to the stationary member; and
a stator core comprising:
  a core back fixedly inserted onto an outer surface of a stationary member;
  a plurality of teeth protruding from the core back in an outer diameter direction, wherein a coil is wound around the plurality of teeth so as to allow magnetic flux from a magnet to flow to the teeth;
  front end portions defining outer edges of the teeth, respectively; and
  body portions defining a length of the teeth and having a width increasing from the core back toward the front end portions, respectively,
  wherein the body portions respectively include indented portions, each being depressed in one surface of an outer portion of a corresponding one of the body portions while protruding to the other surface thereof.

6. The motor device of claim 5, wherein the indented portions have circumferential surfaces with the same diameter.

7. The motor device of claim 5, wherein the teeth are formed to satisfy a conditional expression below:

$$0.57 \leq \frac{(Wmax - \Phi D)}{Wmin} < 1.4$$

where Wmin denotes a width of each of the body portions to which the core back is connected, $\Phi D$ denotes a diameter of a circumferential surfaces of each of the indented portions, and Wmax denotes a width of each of the body portions in which the centers of the indented portions are placed, respectively.

8. The motor device of claim 5, wherein the teeth are formed to satisfy a conditional expression below:

$$0.85 \leq \frac{B}{A} \leq 0.95$$

where B denotes a radius of a circumference drawn along respective centers of the indented portions while being centered on the center of the core back, and A denotes a radius of a circumference drawn along respective outer surfaces of the front end portions while being centered on the center of the core back.

\* \* \* \* \*